US012437890B2

(12) United States Patent
Kurul et al.

(10) Patent No.: US 12,437,890 B2
(45) Date of Patent: Oct. 7, 2025

(54) SYSTEMS AND METHODS FOR REDUCING NONCONDENSABLE GAS BUILDUP IN COOLANT SYSTEMS

(71) Applicant: GE-Hitachi Nuclear Energy Americas LLC, Wilmington, NC (US)

(72) Inventors: Necdet Kurul, Wilmington, NC (US); Charles L. Heck, Wilmington, NC (US); David H. Hinds, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 561 days.

(21) Appl. No.: 17/831,058

(22) Filed: Jun. 2, 2022

(65) Prior Publication Data
US 2023/0395271 A1    Dec. 7, 2023

(51) Int. Cl.
*G21C 19/317*    (2006.01)
*G21C 15/243*    (2006.01)
(Continued)

(52) U.S. Cl.
CPC ......... *G21C 19/317* (2013.01); *G21C 15/243* (2013.01); *G21C 9/06* (2013.01); *G21C 15/20* (2013.01); *G21C 19/307* (2013.01)

(58) Field of Classification Search
CPC .... G21C 19/317; G21C 15/243; G21C 15/20; G21C 19/307; G21C 9/06
(Continued)

(56) References Cited

U.S. PATENT DOCUMENTS 2,945,794 A * 7/1960 Winters ............... G21C 1/26
                                        376/301
3,755,075 A * 8/1973 Henrie ................ G21C 19/317
                                        376/300
(Continued)

FOREIGN PATENT DOCUMENTS

JP    2011-230064    11/2011
JP    2012-021777    2/2012
(Continued)

OTHER PUBLICATIONS

WIPO, International Search Report in corresponding PCT application PCT/US2023/067818, Oct. 19, 2023.
(Continued)

*Primary Examiner* — Jack W Keith
*Assistant Examiner* — Daniel Wasil
(74) *Attorney, Agent, or Firm* — Alley IP

(57) ABSTRACT

Systems reduce noncondensable gasses within coolant systems with a recombiner into which the fluid coolant flows. Flow through the recombiner may be opposite that of a heat exchanger. The recombiner includes a catalyst that combines or degrades the noncondensable gasses, such as a Group 9-11 transition metal that speeds reaction of noncondensable gasses. The catalyst may be a liner, plate, aggregate, et. with openings through which all coolant must flow. The recombiner may be insulated to prevent heat exchange and condensation and may be tilted from a vertical to enhance draining and fluid flow. The entire system may be passive without any operator intervention or moving structures. Systems can be made from isolation condenser systems in nuclear power plants in an isolation condenser pool by adding a recombiner to existing coolant systems. Systems may also be made by including a recombiner with new isolation condensers.

20 Claims, 4 Drawing Sheets

(51) Int. Cl.
*G21C 9/06* (2006.01)
*G21C 15/20* (2006.01)
*G21C 19/307* (2006.01)

(58) Field of Classification Search
USPC .......................................................... 376/301
See application file for complete search history.

(56) References Cited

U.S. PATENT DOCUMENTS

| | | | | |
|---|---|---|---|---|
| 4,228,132 | A | * | 10/1980 | Weems ................ G21C 19/317 376/300 |
| 4,302,419 | A | * | 11/1981 | Abrams ............... G21C 19/317 976/DIG. 271 |
| 5,301,217 | A | * | 4/1994 | Heck .................... G21C 19/317 376/301 |
| 9,496,058 | B2 | | 11/2016 | Marquino et al. |
| 10,867,712 | B2 | | 12/2020 | Hunt et al. |
| 2011/0268242 | A1 | | 11/2011 | Lizuka et al. |
| 2016/0042817 | A1 | | 2/2016 | Reinsch |
| 2020/0279662 | A1 | | 9/2020 | Marquino et al. |
| 2023/0295483 | A1 | | 9/2023 | Liang et al. |

FOREIGN PATENT DOCUMENTS

| | | |
|---|---|---|
| JP | 2012-108059 | 6/2012 |
| JP | 2013-170883 | 9/2013 |
| KR | 10-2085983 | 3/2020 |
| WO | 2022-022355 | 2/2022 |

OTHER PUBLICATIONS

WIPO, Writton Opinion in corresponding PCT application PCT/US2023/067818, Oct. 19, 2023.

* cited by examiner

SYSTEMS AND METHODS FOR REDUCING NONCONDENSABLE GAS BUILDUP IN COOLANT SYSTEMS

BACKGROUND

FIG. 1 is an illustration of a related art isolation condenser system (ICS) 300 useable in a nuclear reactor, such as Boiling Water Reactor 142. As shown in FIG. 1, system 300 may include one or more isolation condensers 310 in ICS pool 311 above reactor 142, any of which may potentially be inside of a building such as a containment or reactor building at a commercial nuclear power plant. ICS 300 may include steam inlet 362 from reactor 142 and condensate return pipe 363 to reactor 142 to passively transfer heat and condense a reactor coolant through the heat sink of ICS pool 311. One or more valves 200 may join steam inlet 362 and condensate return pipe 363 to reactor 142 and allow selective actuation of ICS 300 by opening and closing. Co-owned U.S. Pat. No. 10,867,712 issued Dec. 15, 2020 to Hunt et al. describes a related ICS system and is incorporated herein by reference in its entirety.

ICS 300 may include multiple isolation condensers 310 fed by a single steam inlet 362 that divides between condensers 310 and further divides into multiple feed lines for condensers 310. Each condenser 310 may include an upper drum 313 that acts as a manifold for all incoming energetic steam. Several heat exchange tubes 314 may carry the steam vertically downward to transfer heat to pool 311 from the coolant, potentially condensing it. Lower drum 315 receives the cooled fluid from the heat exchange tubes and returns the condensate to condensate return pipe 363. This one-way vertically-downward arrangement, combined with condensation and higher density of the coolant achieved through heat transfer, may drive a natural circulation of coolant through condensers 310. As such, drums 313 and 315 and tubes 314 are typically manufactured with maximum heat exchange properties to the surrounding pool 311.

This background provides a useful baseline or starting point from which to better understand some example embodiments discussed below. Except for any clearly-identified third-party subject matter, likely separately submitted, this Background and any figures are by the Inventor(s), created for purposes of this application. Nothing in this application is necessarily known or represented as prior art.

SUMMARY

Example embodiments include systems that limit accumulation of noncondensable gasses within power plant fluid coolant and coolant systems, such as hydrogen or oxygen gas in a water primary coolant of a nuclear power plant. A recombiner connects between two separated volumes in the coolant systems, such as between drums, manifolds, plenums, etc. on opposite sides of heat exchanger tubes. While coolant may flow into the upper volume, down through the heat exchange tubes where it potentially condenses, and into the lower volume, it may flow in the reverse direction, from the lower volume back to the upper volume, through the recombiner. The recombiner includes a catalyst that chemically alters the noncondensable gasses in this reverse flow, such as a catalytic metal or organic material that speeds formation of water or other oxides and hydrides, from noncondensable gasses like oxygen and hydrogen. The catalyst may be positioned in any manner in the recombiner to interact with the flow and noncondensable gasses, including as the inner perimeter of the recombiner itself, or as potentially replaceable plates, grids, and vanes that drive flow to contact the catalyst. The recombiner may be insulated and generate heat through the chemical alteration, such that the coolant does not substantially condense in this reverse flow, unlike through the heat exchange tubes. The recombiner may be tilted with respect to a vertical and/or the heat exchange tubes such that any liquids will drain from, or not block, the catalyst in the recombiner. Powered drives, such as pumps, fans, etc. are not required to move the coolant into the recombiner and remove noncondensable gasses therefrom. Recombiners are useable with isolation condenser systems in nuclear power plants, potentially immersed in the isolation condenser pool with the condenser. Example embodiment systems can be formed by adding a recombiner to existing coolant systems, such as a retrofit during a maintenance outage, or manufactured with new condensers prior to installation in the plant.

BRIEF DESCRIPTIONS OF THE DRAWINGS

Example embodiments will become more apparent by describing, in detail, the attached drawings, wherein similar elements are represented by similar reference numerals. The drawings serve purposes of illustration only and thus do not limit example embodiments herein. Elements in these drawings may be to scale with one another and exactly depict shapes, positions, operations, and/or wording of example embodiments, or some or all elements may be out of scale or embellished to show alternative proportions and details.

DETAILED DESCRIPTION

Figure 1:
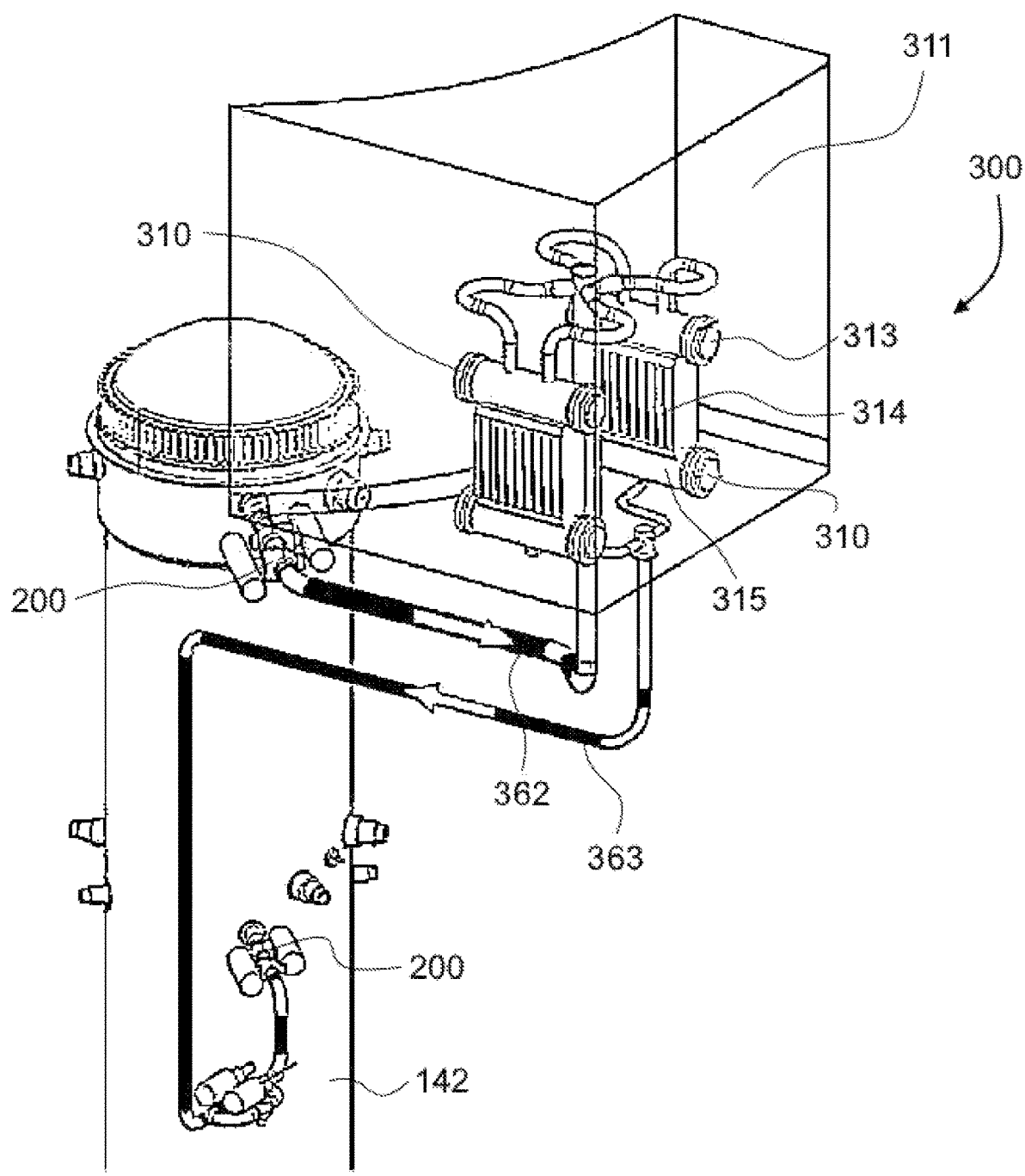
FIG. 1 is an illustration of a related art isolation condenser system in a nuclear power plant.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Membership terms like "comprises," "includes," "has," or "with" reflect the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude presence or addition of other subject matter in modified terms. The use of permissive terms like "may" or "can" reflect optionality such that modified terms are not necessarily present, but absence of permissive terms does not reflect compulsion. In listing items in example embodiments, conjunctions and inclusive terms like "and," "with," and "or" include all combinations of one or more of the listed items without exclusion of non-listed items. The use of "etc." is defined as "et cetera" and indicates the inclusion of all other elements belonging to the same group of the preceding items, in any "and/or" combination(s). Modifiers "first," "second," "another," etc. do not confine modified items to any order. These terms are used only to distinguish one element from another; where there are "second" or higher ordinals, there merely must be that many number of elements, without necessarily any difference or other relationship among those elements.

When an element is related, such as by being "connected," "coupled," "on," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.).

As used herein, singular forms like "a," "an," and the are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Relative terms such as "almost" or "more" and terms of degree such as "approximately" or "substantially" reflect 10% variance in modified values or, where understood by the skilled artisan in the technological context, the full range of imprecision that still achieves functionality of modified terms. Precision and non-variance are expressed by contrary terms like "exactly."

As used herein, "axial" and "vertical" directions are the same up or down directions oriented along the major axis of a nuclear reactor, often in a direction oriented with gravity. "Transverse" directions are perpendicular to the "axial" and are side-to-side directions at a particular axial height, whereas "radial" is a specific transverse direction extending perpendicular to and directly away from the major axis of the nuclear reactor.

The structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations aside from exact operations described below. It should be presumed that any embodiment or method having features and functionality described below, in any workable combination, falls within the scope of example embodiments.

The inventors have recognized that noncondensable gasses can accumulate in coolant systems whose operating fluids can break down into such gasses during operation. These gasses impede heat removal by condensation, creating a potential for blocking coolant flow paths, combustion, and/or other undesired chemical interaction. Particularly in radioactive environments like nuclear reactor coolant systems, radiolytic breakdown of a coolant may be particularly likely. And particularly in passive coolant systems that use natural circulation between specially-arranged heat sources and sinks to avoid reliance on active parts or operator intervention, noncondensable gasses may resist or block such circulation, deplete coolant volume, and/or potentially combust, corrode, or otherwise negatively react in these systems. Thus, nuclear reactor passive coolant systems, such as an ICS for example, may be particularly likely to experience unwanted noncondensable gas buildup. But blocking natural circulation paths with recombining structures and/or using active ventilation or pumping may interfere with the desired natural circulation and passive, simplified configurations of coolant systems. To overcome these newly-recognized problems as well as others, the inventors have developed example embodiments and methods described below to address these and other problems recognized by the inventors with unique solutions enabled by example embodiments.

The present invention is systems and methods of reducing noncondensable gasses in coolant systems. In contrast to the present invention, the few example embodiments and example methods discussed below illustrate just a subset of the variety of different configurations that can be used as and/or in connection with the present invention.

Figure 2:
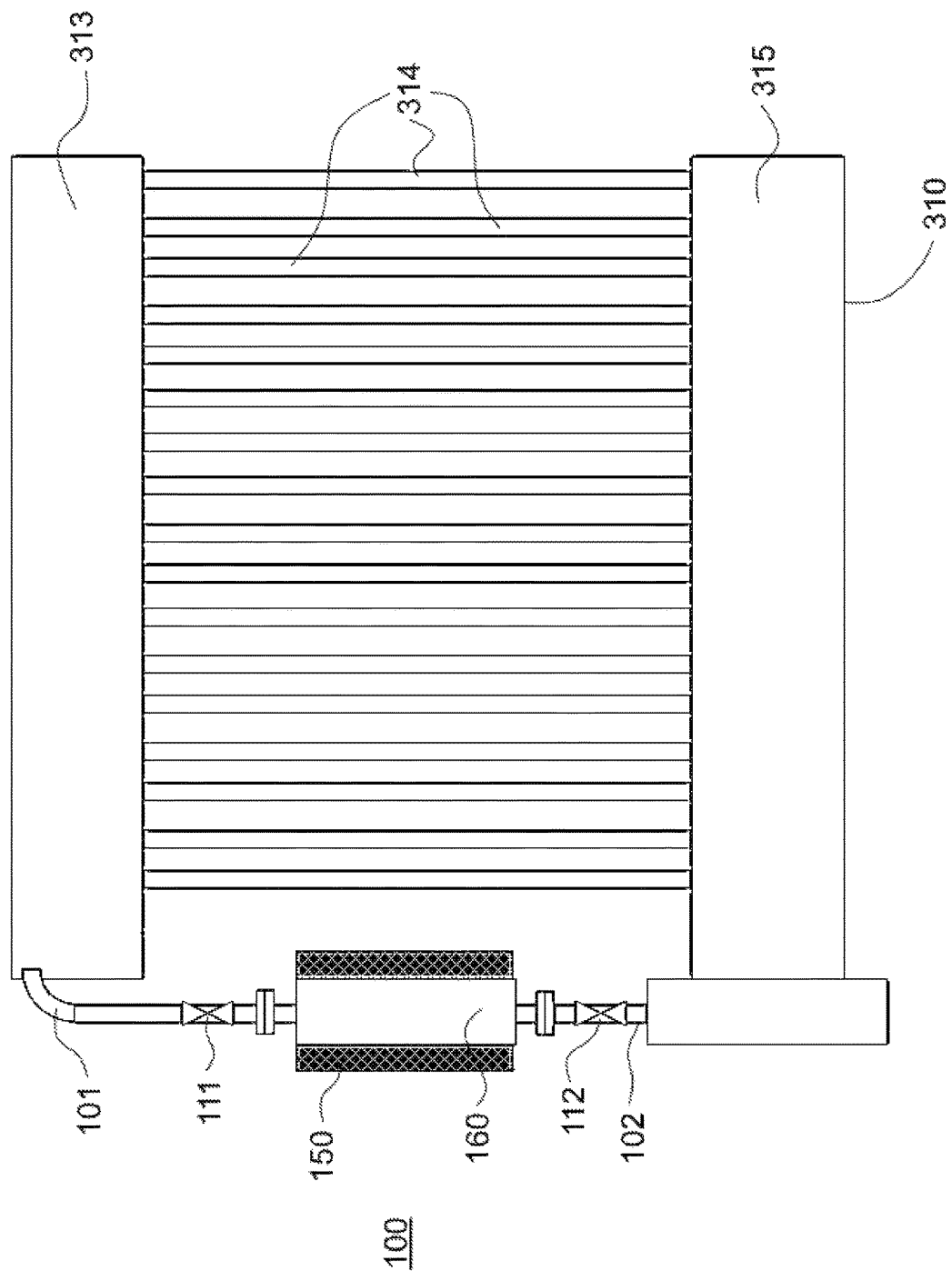
FIG. 2 is an illustration of an example embodiment recombiner system.

FIG. 2 is an illustration of an example embodiment recombiner system 100 useable with an isolation condenser 310, such as those used in a nuclear reactor ICS. As shown in FIG. 2, example embodiment recombiner system 100 includes recombiner 160 in fluid communication with upper drum 313 and lower drum 315 of isolation condenser 310. For example, upper pipe 101 may join between recombiner 160 and upper drum 313, and lower pipe 102 may join between recombiner 160 and lower drum 315. Any other connection pathway may be used between recombiner 160 and isolation condenser 310, including direct joining to different points of isolation condenser 310. Upper isolation valve 111 and/or lower isolation valve 112 may join between recombiner 160 and isolation condenser 310 to isolate, or prevent fluid flow through, recombiner 160, such as for replacement, installation, or maintenance. Recombiner 160 may be joined to isolation condenser 310 during manufacture or may be added to an existing isolation condenser 310 by creating a flow path from the condenser through recombiner 160 added later. For example, recombiner 160 may be connected to an existing condenser 310 by forming flow paths from upper drum 313 and lower drum 315 through recombiner 160. This may be done at any time, including while ICS pool 311 (FIG. 1) is at a level below recombiner 160, such as during a maintenance period or outage.

Figure 3:
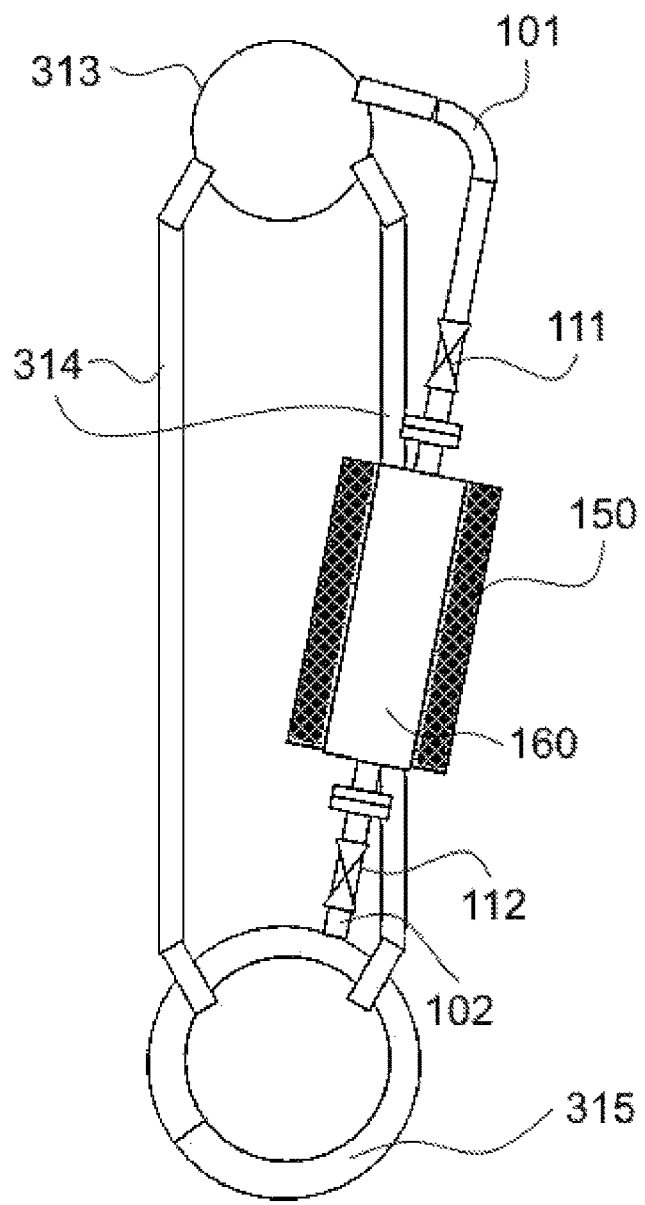
FIG. 3 is a transverse side view of the example embodiment recombiner system of FIG. 2.

As seen in FIGS. 2-3, recombiner 160 may be connected for fluid entry at or around a highest vertical point of lower drum 315, where noncondensable gasses and gaseous coolant are more likely to accumulate, for return to upper drum 313. Similarly, recombiner 160 may connect to upper drum 313 at a higher point for gaseous return, nearer to where more energetic reactor coolant may enter upper drum 313. While only one recombiner 160 is shown in example embodiment system 100, it is understood that multiple recombiners 160 may be used in connection with isolation condenser 310. Recombiner 160 may join at other points to isolation condenser 310, or even steam inlet 362 (FIG. 1) or other reactor structures to intake noncondensable gasses therefrom. Recombiner 160 may also join with other structures and volumes where noncondensable gasses may gather to aid in their removal.

Recombiner 160 is a flow conduit and includes and/or is fabricated of a catalyst material that substantially speeds the recombination of noncondensable gasses passing into recombiner 160. For example, noncondensable gasses generated due to radiolysis and/or other conditions of an operating power plant may accumulate in lower drum 315; that is, free gasses like hydrogen and oxygen, typically in their diatomic form, may form from dissociation from a fluid coolant or introduction into a reactor system. A catalyst material like palladium, platinum, rhodium, another group 9-11 transition metal, organic materials, etc. speeds recombination and/or degradation of these gasses. For example, oxygen and hydrogen gasses exposed to palladium may rapidly combine into oxides, hydrides, liquid coolant itself, etc. that pose lower risk of combustion, lower risk of introducing gasses into the reactor coolant, and/or lower risk of causing air gaps or blocks within coolant loops.

Recombiner 160 may include insulator 150 that limits heat transfer to a surrounding heat sink, in which recombiner 160 and isolation condenser 310 may be submerged. For example, insulator 150 may be a vacuum or air gap or layer of insulation wrapped around an outer wall of recombiner 160 and/or any connections such as piping 101 and 102. Insulator 150 may be compatible with submerged operations as well as temperatures and other conditions encountered in an ICS.

If recombiner 160 is insulated, there may be reduced heat transfer to a surrounding heat sink, unlike the substantial heat transfer from heat exchange tubes 314 in isolation condenser 310. Further, any recombination or degradation of noncondensable gasses caused by the catalyst material in recombiner 160 may generate additional heat. Without loss of heat, recombiner 160 may not substantially condense any fluid coolant flowing through recombiner 160. The lack of pressure head from condensing liquid moving downward may enhance vertically upward, or reverse, flow of gasses through recombiner 160, including gaseous coolant and noncondensable gasses from lower drum 315.

FIG. 3 is an illustration of example embodiment recombiner system 100 from a transverse side of FIG. 2, illustrating additional alignment that may be used to enhance vertical upward flow. As seen in FIG. 3, recombiner 160, and any connections to drums 313 and 315 may be vertical with some offset. If grids or vanes, like honeycomb shapes or axial swirl vanes, are used in catalytic material in recombiner 160, some angling with respect to the vertical may aid any liquid to drain out from ledges or horizontal surfaces of the material. This may prevent liquid from wetting and blocking gas contact with catalytic material. The liquid may drain to a bottom of recombiner 160, potentially back into lower drum 315, so as not to block upward gaseous entry and flow through recombiner 160 and/or catalytic material therein. Any tilting may still permit recombiner 160 to take fluid entry near a top of lower drum 315, where noncondensable gasses and gaseous coolant are more likely to accumulate and return to upper drum 313.

As seen from FIGS. 2-3, recombiner 160 may operate as a reverse flow path through isolation condenser 310, providing an upward or opposite flow direction of gasses from lower drum 315 to upper drum 313. This is contrary to the typical downward flow of two-phase coolant through heat exchange tubes 314 driven by condensation from heat sinking. Any insulation and heat of reaction from recombination of noncondensable may further urge upward flow through recombiner 160. In this way noncondensable gasses may be particularly directed back up through recombiner 160 for conversion into less harmful compounds, while vapor or other gaseous coolant traveling with the same merely re-enters upper drum 313 for another circuit down through heat exchange tubes 314. In this way recombiner 160 may provide a passive reverse flow path for gasses, including noncondensable gasses and non-condensed two-phase flows, back up through isolation condenser 310 without any moving structures, such as powered pumps, fans, or motors. While such active drivers of fluid back through recombiner 160 are useable with example embodiments, a passive configuration may occupy less space, have lower risks of failure, and/or be more easily positioned within an isolation condenser heat sink such as ICS pool 311 (FIG. 1).

Figures 4A, 4B:
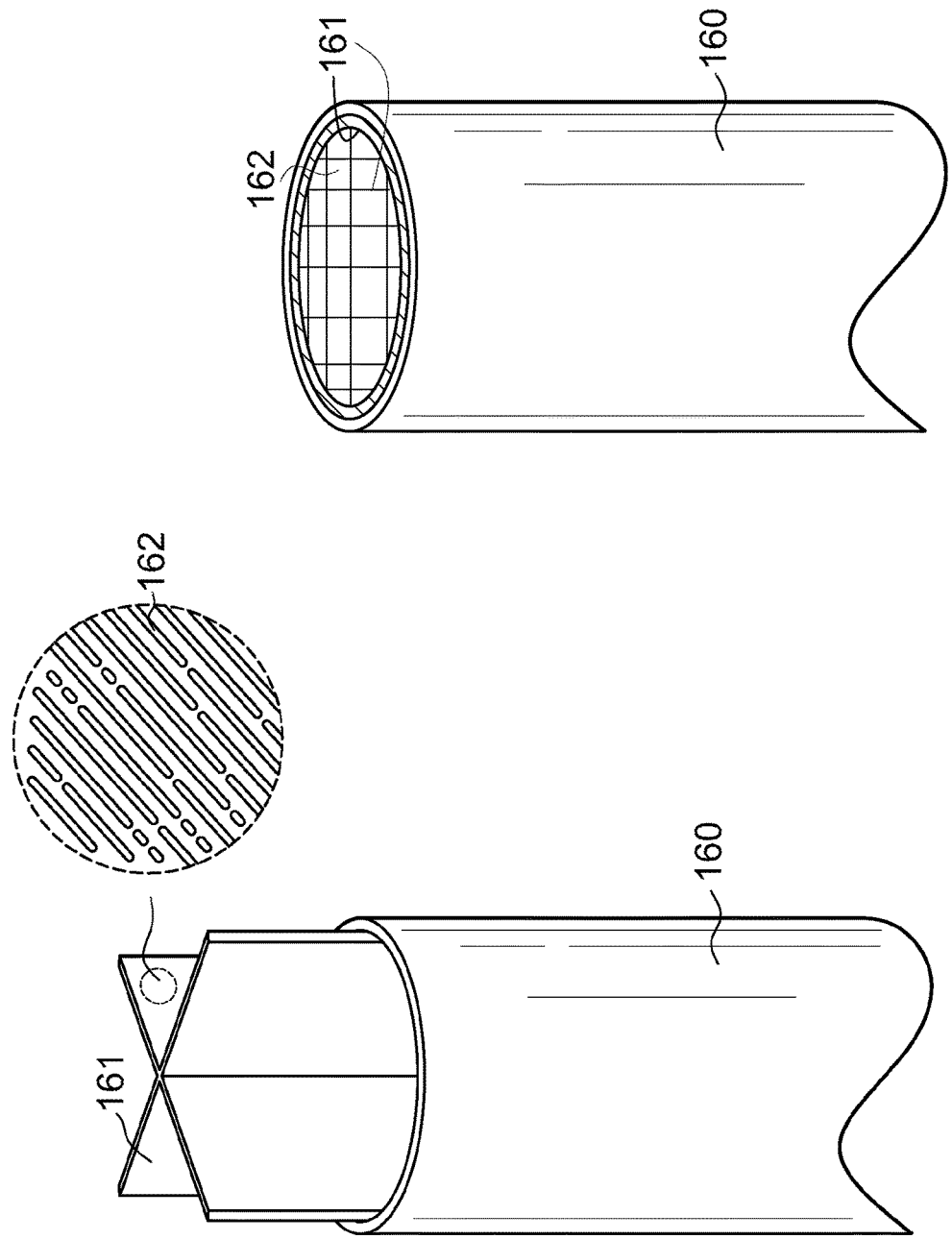
FIG. 4A is an illustration of an example arrangement and configuration of catalytic material in an example embodiment system.
FIG. 4B is an illustration of an example arrangement and configuration of catalytic material in an example embodiment system.

FIGS. 4A-B illustrate some different example possibilities for arrangement and configuration of catalytic material in recombiner 160. U.S. Pat. No. 9,496,058 issued Nov. 15, 2016 to Marquino et al. illustrates similarly useable arrangements of catalytic materials from distinct spaces and is incorporated by reference herein in its entirety. As seen in FIG. 4A, cruciform catalytic sheet 161 may be vertically inserted in recombiner 160 and occupy a substantial cross-section of the same. Openings 162 or grooves in the catalytic material may enhance fluid cross-flow and recombination or degradation of noncondensable gasses. As seen in FIG. 4B, catalytic liner 161 may extend about an inner perimeter of recombiner 160. Yet further, a grid or honeycomb catalytic insert 161 having several openings 162 may be vertically inserted into recombiner 160 or extend across an area of complete internal flow path of the same in a transverse direction. Still yet other configurations, such as a pebble-bed or filter-style catalytic material including several small pieces packed in recombiner 160, or radial vanes that force fluid to move outward, are useable. Each of these configurations and others are useable in any combination with one another or individually. A single catalytic material, such as palladium plates and grids, could be used, or varied materials, such as vanes of platinum and liners of rhodium for example, could be used based on desired chemical properties.

Example embodiment recombiner system 100 may otherwise be fabricated of materials that are compatible with an operating nuclear reactor environment, including materials that maintain their physical characteristics when exposed to high-temperature fluids and radiation without substantially changing in physical properties, such as becoming substantially radioactive, melting, brittling, retaining/adsorbing radioactive particulates, etc. For example, metals such as stainless steels and iron alloys, nickel alloys, zirconium alloys, etc., including austenitic stainless steels 304 or 316, XM-19, Alloy 600, etc., are useable in system 100 components. Similarly, direct connections between distinct parts and all other direct contact points may be lubricated and/or fabricated of alternating or otherwise compatible materials to prevent seizing, fouling, metal-on-metal reactions, etc.

Some example embodiments and methods thus being described, it will be appreciated by one skilled in the art that examples may be varied through routine experimentation and without further inventive activity. For example, although recombiners with vertical isolation condensers are used in some example systems, it is understood that other systems like a passive containment cooling system are useable with example embodiments. Variations are not to be regarded as departure from the spirit and scope of the example embodiments, and all such modifications as would be obvious to one skilled in the art are intended to be included within the scope of the following claims.

The invention claimed is:

1. A system for removing noncondensable gasses from coolant, the system comprising:
 a condenser having an upper volume configured to receive a coolant having at least a part condensable vapor, a lower volume configured to return the coolant, and a plurality of heat exchange tubes connecting the upper and lower volumes so as to permit the coolant to flow in the tubes from the upper volume to the lower volume while condensing the vapor in the coolant; and a recombiner connected between the upper volume and the lower volume, wherein the recombiner defines a flow path outside of the condenser, wherein the flow path is out of the lower volume, through the recombiner, and into the upper volume, and wherein the recombiner includes a catalytic material in the flow path configured to remove noncondensable gasses flowing into the recombiner from the lower volume.

2. The system of claim 1, wherein the recombiner further includes an insulator configured to prevent condensation of the coolant.

3. The system of claim 1, wherein the catalytic material is at least one of platinum and palladium.

4. The system of claim 1, wherein the catalytic material lines the flow path of the recombiner.

5. The system of claim 1, wherein the catalytic material is a plate with openings that spans the flow path of the recombiner.

6. The system of claim 1, wherein the plurality of heat exchange tubes are aligned in parallel between the upper volume and the lower volume, and wherein the recombiner is angled between the upper volume and the lower volume so as to not be parallel with the heat exchange tubes.

7. The system of claim 1, wherein the upper volume is an isolation condenser upper drum, and wherein the lower volume is an isolation condenser lower drum, the system further comprising:
an isolation condenser pool surrounding the condenser and the recombiner.

8. The system of claim 7, further comprising:
a steam supply line configured to carry the coolant to the condenser; and
a condensate return line configured to carry the coolant from the condenser when condensed.

9. The system of claim 1, wherein the system includes no powered pump or fan.

10. The system of claim 1, further comprising:
a relief line connected to the upper volume and configured to provide steam as the coolant; and
a condensate return line connected to the lower volume and configured to return water condensed from the steam, wherein the condenser is one of a plurality of isolation condensers immersed in an isolation condenser pool.

11. The system of claim 10, wherein the flow path is an insulated flow path through the isolation condenser pool.

12. The system of claim 10, wherein the catalytic material is at least one of platinum and palladium.

13. The system of claim 10, wherein the catalytic material lines an internal flow path of the recombiner.

14. The system of claim 10, wherein the catalytic material is a plate with openings that spans an internal flow path of the recombiner.

15. The system of claim 10, wherein the plurality of heat exchange tubes are substantially vertical, and wherein the flow path is angled with respect to the vertical.

16. The system of claim 10, further comprising:
a boiling water nuclear reactor pressure vessel connected to the relief line and the condensate return line, wherein the relief line connects to the vessel vertically above where the condensate return line connects to the vessel.

17. A method of forming the system of claim 1, the method comprising:
connecting the recombiner between the upper and lower volumes of the condenser, wherein the condenser has previously been installed in an isolation condenser pool in a nuclear power plant.

18. The method of claim 17, wherein the connecting is performed while the isolation condenser pool is drained below the recombiner.

19. The method of claim 17, wherein the connecting is performed during a maintenance outage of the nuclear power plant.

20. The method of claim 17, wherein the recombiner is insulated from the isolation condenser pool.

* * * * *